United States Patent [19]

Cohen et al.

[11] Patent Number: 4,844,856
[45] Date of Patent: Jul. 4, 1989

[54] PROCESS FOR AUTOMATIC REGULATION OF THE SOLUBLE BORON CONTENT OF THE COOLING WATER OF A PRESSURIZED WATER NUCLEAR REACTOR

[75] Inventors: Yvan Cohen, Brie-sur-Marne; Pierre Deroubaix, Paris, both of France

[73] Assignee: Framatome, Courbevoie, France

[21] Appl. No.: 589,788

[22] Filed: Mar. 15, 1984

[30] Foreign Application Priority Data

Apr. 21, 1983 [FR] France .................. 83 06545

[51] Int. Cl.$^4$ .................................... G21C 7/08
[52] U.S. Cl. .................... 376/217; 376/219; 376/236; 376/237; 376/242
[58] Field of Search ............... 376/216–219, 376/236–238, 328, 241, 242

[56] References Cited

U.S. PATENT DOCUMENTS

| | | | |
|---|---|---|---|
| 3,380,889 | 4/1968 | Loose ............................... | 376/219 |
| 3,551,289 | 12/1970 | Eich et al. ...................... | 376/219 |
| 3,998,693 | 12/1976 | Musick ........................... | 376/217 |
| 4,075,059 | 2/1978 | Bruno et al ..................... | 376/217 |
| 4,129,475 | 12/1978 | Spurgin et al. ................. | 376/217 |
| 4,222,822 | 9/1980 | Mueller et al. ................. | 376/218 |
| 4,299,657 | 11/1981 | Abenhaim et al. ............. | 376/217 |
| 4,470,949 | 9/1984 | DeRoubaix et al. ........... | 376/217 |

Primary Examiner—Salvatore Cangialosi
Attorney, Agent, or Firm—Pollock, Vande Sande & Priddy

[57] ABSTRACT

A process for automatic regulation of the soluble boron content of the cooling water of a pressurized water nuclear reactor in which operating regions (2, 3) of the means of boration and of the means of dilution respectively are determined a priori, corresponding to pairs of values of two control parameters relating to the position of the reactor regulating group in the core and to the deviation of the axial power imbalance relative to the reference axial imbalance. The momentary value of the control parameters is determined continuously during the operation of the reactor, and the stopping or the triggering of the means for boration or for dilution is commanded when the operating point crosses a boundary of an operating region (2, 3).

The invention applies in particular to a nuclear reactor controlled in G mode.

7 Claims, 2 Drawing Sheets

PROCESS FOR AUTOMATIC REGULATION OF THE SOLUBLE BORON CONTENT OF THE COOLING WATER OF A PRESSURIZED WATER NUCLEAR REACTOR

FIELD OF THE INVENTION

The invention relates to a process for automatic regulation of the soluble boron content of the cooling water of a pressurized water nuclear reactor.

BACKGROUND OF THE INVENTION

Pressurized water nuclear reactors have a core consisting of assemblies arranged vertically and side-by-side in a vessel containing pressurized water which is responsible for cooling the core and transporting the heat from this core to the steam generators. The steam provided by the steam generators makes it possible to drive a turbine which is itself responsible for driving a turbo-alternator producing electric current.

Depending on the needs of the electricity network and on the manner in which the power station is coupled to other nuclear power stations, it is necessary to ensure the control of the nuclear reactor to obtain from this reactor at any time a power corresponding to the power demanded.

The control of the reactor is usually ensured by the vertical displacement, inside the core, of control rods which absorb the neutrons. In the most frequent modes of control of a pressurized water nuclear reactor, the movement of a control group consisting of highly absorbing rods is controlled automatically by employing as a regulating parameter the deviation between the real mean temperature of the core and a reference temperature which is a linear function of the power which the nuclear reactor has to supply to the turbine. However, in all the modes of control of a pressurized water nuclear reactor, it is necessary to have available an additional means for controlling the nuclear reactor. This additional means consists of a system for boration and dilution of the reactor cooling water, i.e., a system of means making it possible to vary the soluble boron content of the nuclear reactor cooling water, which can be introduced in the form of boric acid or, on the contrary, diluted by introducing pure water. The increase in the soluble boron content makes it possible, in fact, to increase the absorption of the neutrons by the cooling fluid and hence to reduce the reactor power. The dilution obviously has an opposite effect.

The system for boration and dilution of the reactor cooling water makes it possible to complement the action of the groups of control rods and, in particular, to correct the long-term effects due to the variations in reactor reactivity. These long-term effects which accompany the variations in reactor reactivity include in particular the formation and the disappearance of xenon through a nuclear reaction in the reactor core. The appearance and the conversion of xenon have, in themselves, a major influence on the reactivity and on the axial distribution of power in the reactor core.

The axial distribution of power in the reactor core, i.e. the distribution of power in the vertical direction, is in fact neither homogeneous nor constant for a variety of reasons, the main ones of which are that the control rods employed for controlling the reactor are generally inserted only over a part of the height of the core, that this insertion varies over time, and that the density of the cooling water and the concentration of xenon in the reactor core are not constant along its height.

One of the objectives sought after in the course of reactor control is to avoid the power distribution in the core being excessively imbalanced between the upper part and the lower part of the core.

To control the axial distribution of power in the core, there are usually available means for measuring the neutron flux at various heights in the core and means for calculating a parameter expressing the imbalance of power in the core, called "axial power inbalance $\Delta I$" and defined as follows:

$$\Delta I = P_H - P_B$$

where $P_H$ is the power in the high half of the core, $P_B$ the power in the low half of the core and $\Delta I$ the axial power imbalance expressed as a percentage of the nominal power.

More precisely, a determination is made of the deviation in the value of the axial imbalance measured relative to a reference axial power imbalance $\Delta I$ ref which corresponds to the value of the $\Delta I$ measured at 100% of the reactor power, the control rods being virtually drawn out and the xenon being at equilibrium throughout the reactor core.

In addition to the regulation of power with control rods comprising, in particular, the movement of a control group as a function of the deviation in the core temperature relative to a reference temperature, there is in operation a manual control of the boron content of the cooling water to make it possible to conform to the instructions for positioning the control rods as a function of the reactor power level. These positioning instructions are established so as to maintain the deviation in the power imbalance relative to the reference imbalance in a zone of small amplitude around the zero value.

The means for boration and the means for dilution are controlled manually by an operator. This partly manual mode of control can be considered as relatively satisfactory in the case where the power station is employed at a constant power level or with very slow variations in power levels.

During an operation of the power station following loading, when the variations in power are more numerous and faster, the necessary actions of boration or dilution are most frequent. It can then be very useful to have available a means of automatic control of the actions of boration and dilution.

In U.S. Pat. No. 3,570,562, a part of the primary cooling water is diverted continuously into a measuring assembly permitting the momentary boron concentration in this primary water to be determined. The boron concentration is adjusted automatically by virtue of a regulator, as a function of the power demanded from the reactor, the permitted boron concentration limits, and the position of the control rods in the reactor core.

Such a system of automatic regulation is, however, complex because it requires the continuous determination of the boron concentration in the cooling fluid and the establishment of a correlation between the required value of the concentration and the value of various control parameters of the reactor.

In French Pat. No. 2,392,472, there is described a system for automatic boration and dilution based on the comparison between the mean temperature of the core and the reference temperature representing the power demanded by the turbine from the nuclear reactor.

In the case of a mode of reactor control such as described in French Pat. No. 2,395,572 owned by the present assignee, methods of automatic control of the boron content such as described above would not be applicable.

In the control process described in French Pat. No. 2,395,572, groups of control rods having reduced anti-reactivity are moved within the core, only as a function of the power demanded from the turbine. A group of highly absorbing control rods which is different from the power regulation groups is moved as a function of the deviation between the mean temperature of the core and the reference temperature. This temperature regulation group is moved in a manner which is totally independent of the power regulation groups, between control boundaries defined by the operating mode of the reactor and the state of change in the reactor core. To maintain the regulating group between these control boundaries, the concentration of boron in the primary fluid is varied either manually or automatically when the regulating group moves to reach one of the control boundaries.

There is therefore no automatic regulation of the concentration of soluble boron in the cooling water so long as the regulating group does not move so as to reach or go beyond these control limits.

Furthermore, the axial power distribution which is disturbed to a lesser degree than in other modes of control by the power regulating groups, is not controlled automatically.

SUMMARY OF THE INVENTION

The object of the invention is therefore to offer a process for automatic regulation of the content of soluble boron in the cooling water of a pressurized water nuclear reactor whose control is ensured by the vertical movement of control rods absorbing the neutrons in the core of the reactor consisting of assemblies arranged vertically and side-by-side and by the regulation of the content of soluble boron in the pressurized water by virtue of means of boration and means of dilution of this water, the control rods comprising at least one regulating group consisting of highly absorbing rods which are moved automatically as a function of the deviation between the mean temperature of the core and a reference temperature which is a function of the power which the reactor has to supply and of means associated with the reactor for determining the axial power imbalance in the core and the deviation of this axial imbalance relative to a reference imbalance corresponding to the minimum insertion of the control rods into the core and to the equilibrium of the xenon concentration in this core, this regulating process being capable of acting with certainty following a simple principle to assist the regulating group and permit a sufficiently homogeneous power distribution to be maintained in the core whatever the power program demanded from the reactor.

To this end:

operating regions of the means of boration and means of dilution, respectively, are determined a priori, corresponding to pairs of values of two control parameters, namely a parameter which is characteristic of the position of the regulating group in the core and the deviation in the axial power imbalance relative to the reference imbalance, taking account of the operating conditions of the reactor and the safety standards, and that, in a continuous manner, during the operation of the reactor:

a determination is made of the momentary value of the deviation in the axial power imbalance relative to the reference imbalance and the momentary value of the parameter which is characteristic of the position of the regulating group in the core, forming a pair of values of the control parameters, in the case where the means of boration and the means of dilution are initially at rest, the operation of the means of boration or the means of dilution is triggered if the pair of values of the control parameters corresponds to an operating region of the means of boration or the means of dilution, respectively, and these means are maintained at rest if the pair of values does not correspond to an operating region, and, in the case where the means of boration or the means of dilution are initially operating, the operation of these means is maintained so long as the pair of values of the control parameters corresponds to an operating region of these means of boration or of dilution.

BRIEF DESCRIPTION OF THE DRAWINGS

In order to make the invention properly understood, a description will now be given by way of non-limiting example of an embodiment of the process according to the invention in the case of a pressurized water nuclear reactor comprising means of control such as described in French Pat. No. 2,395,572.

DETAILED DESCRIPTION

Figure 1:
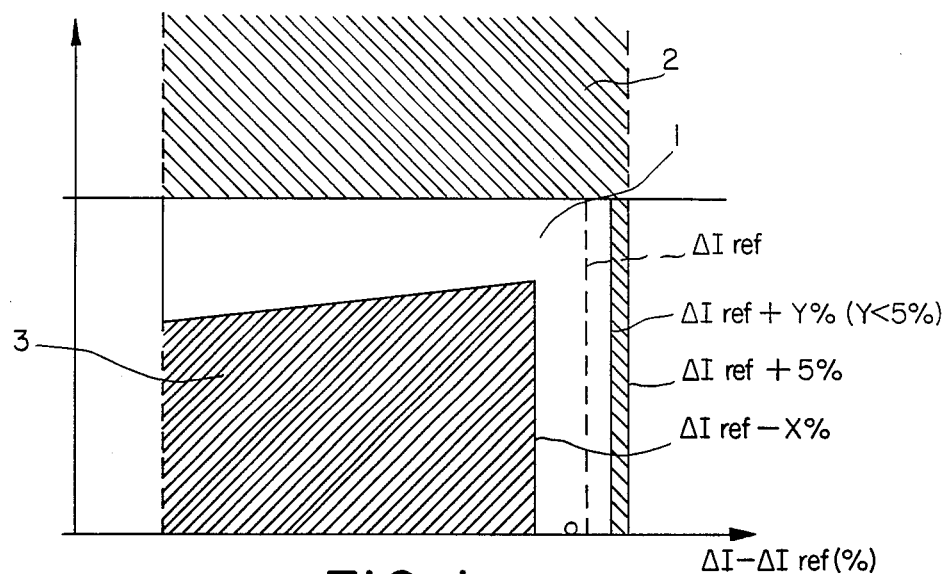
FIG. 1 is a simplified diagram showing the regions of boration and of dilution where the control parameters are shown on two perpendicular axes.

FIG. 1 is a diagram showing the shape of the regions corresponding to the boration and to the dilution as a function of the deviation between the axial power imbalance and the reference axial imbalance in the core of a nuclear reactor and of the position of a regulating group consisting of highly absorbing control rods.

The control mode of the reactor is that described in French Pat. No. 2,395,572. Use is made of a first set of groups of control rods with reduced anti-reactivity, the set being moved as a function of the power demanded from the nuclear reactor by the turbine and solely as a function of this power.

A regulating group R, which is distinct from the preceding groups and consists of highly absorbing rods, is also moved in the reactor core to regulate the temperature of the latter. This regulating group R is moved as a function of the deviation between the real mean temperature of the core and a reference temperature which is a linear function of the power demanded by the turbine. The real mean temperature of the core is determined from the measurement of the temperature of the water in the primary circuit in the hot branch and in the cold branch of this circuit. The regulating group R is actually moved in one or the other direction only if the absolute value of the difference $\Delta T$ between the real temperature and the reference temperature exceeds a certain value corresponding to the half-width of the dead band of displacement of the regulating group.

In the diagram of FIG. 1, the positions of the group R corresponding to the maximum insertion of this group into the core and to its maximum withdrawal, i.e., the lowest position and the highest position of the regulating group, are shown. The parameter representing the position of the group R is plotted as the ordinate and the second control parameter, namely the deviation between the axial power imbalance and the reference axial imbalance, is plotted as abscissa.

The parameter which is characteristic of the position of the group R has been chosen as the number of graduated steps to be executed in the direction of the withdrawal to bring the group into its position, starting from its position of maximum insertion.

FIG. 1 shows very diagrammatically how the zones of boration and of dilution, separated by a neutral zone which corresponds to the working zone of the group R without involving the means of boration or of dilution, are determined. This working zone comprises two distinct parts according to the value of the deviation in the axial power imbalance relative to the reference imbalance. Around the zero position on the abscissa axis, i.e., the position corresponding to $\Delta I + \Delta I$ ref, the working zone of the group R is limited only by the limit of insertion in its lower part and by the limit of withdrawal at its upper part. This zone has a width Y (in % which is the unit plotted along the abscissa axis) on the right of the vertical $\Delta I - \Delta I$ ref=0 and a width X (still in %) on the left of the vertical $\Delta I - \Delta I$ ref=0.

X and Y are determined as a function of the control conditions of the nuclear reactor. These values are chosen in particular so as to permit a sufficiently strict control of the deviation in the axial power imbalance relative to the reference imbalance, while avoiding excessively frequent recourse to the system for boration and dilution, in particular during the to and fro motions of the power regulation groups (called gray groups) and of the temperature regulation group, or group R.

Figure 2:
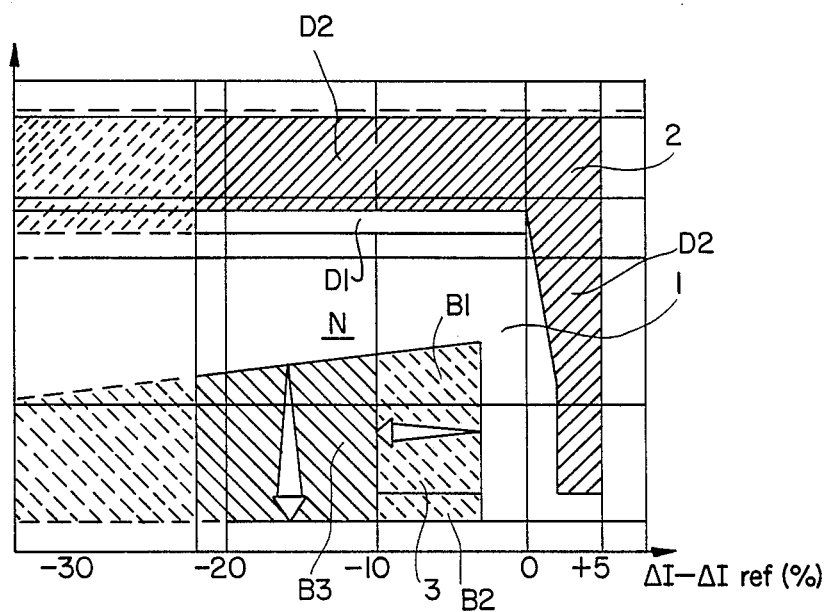
FIG. 2 is a more accurate diagram than the diagram of FIG. 1, showing the zones of boration and dilution as functions of the two control parameters.

We shall see what values have been chosen for X and Y in the case of the particular embodiment described by referring to FIG. 2.

In all cases, Y will be chosen lower than 5%.

When the axial power imbalance $\Delta I$ is lower than $\Delta I$ ref $-X$ %, the regulating group R is permitted to move only in the upper part of the core, between its limiting withdrawal position and a lower position such that the working zone widens when $\Delta I$ moves away from $\Delta I$ ref.

The limitation of the working zone of the group R makes it possible to avoid increasing the axial power imbalance by a high amplitude insertion of highly absorbing rods into the core. The efficiency of the system increases in proportion with the narrowing of the neutral zone. This neutral zone must, however, be sufficiently wide to avoid successive use of the system for dilution and the system for boration at frequent intervals, through overstepping the limits of the neutral zone.

A value will be chosen for the width of the neutral zone which is a function of the efficiency of the system for boration and for dilution and of the regulating group R.

The efficiency of the group R in the upper region of the core depends heavily on the value of the axial power imbalance and diminishes when the deviation in the axial power imbalance relative to the reference imbalance becomes strongly negative. This is the reason why the neutral zone should be proportionately wider as the $\Delta I - \Delta I$ ref is more heavily negative.

The values chosen for the width of the neutral zone in the particular embodiment which will be described with reference to FIG. 2 will be given.

On either side of the neutral zone 1, there are defined a zone of dilution 2 and a zone of boration 3, which are bounded on the right and on the left by two straight lines parallel to the ordinate axis, whose abscissae depend on the power level of the reactor.

These boundary differences relative to the reference axial imbalance are given by the operating trapezoid of the reactor, as a function of the power level, i.e., by the operating limits of the reactor.

In practice, the right-hand boundary of the dilution zone 2 is never very far from $\Delta I - \Delta I$ ref=5%.

During the operation of a pressurized water nuclear reactor such as described in French Pat. No. 2,395,572, the power regulating groups or gray groups have a position which depends solely on the power level demanded from the reactor. To this power level there corresponds a reference temperature which is compared to the real mean temperature of the core determined from measurements of temperature in the hot branch and in the cold branch of the primary circuit. The difference $\Delta T$ between the mean temperature and the reference temperature allows the regulating group R to be moved if $\Delta T$ is greater than the width of the dead band of this group R.

The automatic action on the means of dilution or of boration results from the comparison of the pair of values corresponding to the withdrawn position of the group R and to the difference in the axial power imbalance with the pairs of values corresponding to each of zones 1, 2 and 3 shown in FIG. 1 and corresponding respectively to the neutral zone, the dilution zone and the boration zone.

This is equivalent to saying that the search is made to find the position of the operating point defined by the control parameters (position of the group R and deviation in the axial power imbalance) in relation to the zones 1, 2 and 3 of the diagram of FIG. 1.

The control of the means of dilution or of boration is therefore carried out independently of the control of the regulating group R.

The presence of the operating point in the neutral zone 1 leads to a stoppage of the means of dilution or boration if either of these means were previously operating. This corresponds to a passage of the operating point from the zone 2 or the zone 3 to the zone 1. If the means of boration or of dilution were not operating, these means remain at rest and this corresponds to the operating point staying in the zone 1.

The presence of the operating point in the dilution zone 2 causes a start of operation of these means of dilution if they were initially stopped. This corresponds to a passage of the operating point from the zone 1 to the zone 2.

Similarly, in the case of a passage of the operating point from the zone 1 to the zone 3, the means of boration are caused to operate.

The passage of the operating point from one zone to another can correspond to the group R reaching one of its effective movement boundaries, if the position of the group R which defines one of the two control parameters is the real momentary position of the group R.

This corresponds to a control mode of the means of dilution and of boration which is quite close to that described in French Pat. No. 2,395,572 with, however, a new definition of the working zone of the group R as a function of a new parameter which is taken into account, namely the deviation of the axial power imbalance relative to the reference axial imbalance.

A measurement of the axial power imbalance is carried out using neutron measurements at various heights in the core, and the deviation of this axial imbalance relative to the reference imbalance is calculated.

In the case where the second control parameter, namely, the position of the regulating group R in the core, no longer corresponds to the real momentary value of the withdrawal of the group R, but corresponds to an imaginary value determined by adding to the position signal of the group R a signal which is proportional to the temperature difference $\Delta T$, the boration or the dilution can be triggered independently of the arrival of the group R at one of its movement limits.

In fact, since a movement of the group R can be made to correspond, with some proportionality factor, to each temperature signal $\Delta T$, it is possible to calculate the position of the group R which is needed to produce the temperature correction. By taking this imaginary position of the group R into account as a value of one of the two control parameters, it is possible to trigger a start of dilution or of boration (or a stopping of the dilution or a stopping of the boration) in advance and independently of any movement of the group R.

This is particularly true if the group R is very close to one of its movement limits and if the temperature error signal stays in the dead band of the group R.

The width of the dead band of the group R usually corresponds to a temperature deviation of 0.83° C., corresponding, for the regulating system employed by the present assignee, to a movement of four steps of the regulating group R. If we assume a temperature error signal of 0.3° and an initial position of the control group R at one step above the boration zone, the imaginary position of the group R at $4 \times 0.3/0.83 = 1.4$ steps below the real initial position lies within the boration zone. The means of boration are therefore triggered without a movement of the group R, resulting in cooling of the primary fluid and avoiding a subsequent movement of the group R towards the boration zone followed by a return of the group R towards the neutral zone.

The advantage of the use of imaginary values of the position of the group R, permitting the boration or dilution operations to be anticipated, can thus be seen.

With regard to the upper limit of the neutral zone which corresponds to the lower limit of the dilution zone, this is fixed at a few steps of movement above the upper part of the core. The height of the neutral zone above the upper part of the core will, for example, be chosen as equal to four steps of movement of the group R, corresponding to a $\Delta T$ of 0.83° C.

The movement of the operating point in this zone does not therefore correspond to a real movement of the group R but to a variation in the mean temperature of the primary fluid below the reference temperature. This leads therefore to a toleration of the maximum cooling of the core which is equivalent to the width of the dead band of temperature.

Beyond this limit, the action is as if the group R were situated in the dilution zone and the means of dilution are triggered, producing an increase in reactivity of the core and a reheating of the latter to restore its value to the reference temperature.

A temperature correction is thus effected without movement of the regulating group R.

It is thus apparent that the process according to the invention makes it possible to act in anticipation and to avoid movements of the regulating group R.

FIG. 2 is a diagram showing the dilution and boration zones as a function of the two control parameters which are shown more accurately and for a particular embodiment, in relation to the values chosen as the zone limits.

The neutral zone has thus a width equal to 2% to the right of the vertical $\Delta I - \Delta I \text{ ref} = 0$ and to 3% to the left of this vertical.

For the values of $\Delta I$ below $\Delta I \text{ ref} - 3\%$, the neutral zone has a width ranging from 15 steps of movement of the group R when $\Delta I = \Delta I \text{ ref} - 3\%$ to 20 steps when $\Delta I = \Delta I \text{ ref} - 20\%$.

This width represents in reality the movement of the group R up to the top part of the core which does not actually correspond to the upper limit of the neutral zone and to the lower limit of the dilution zone, which is five steps above the upper part of the core. This corresponds to a possible cooling of the mean core temperature by 0.83° C.

The right-hand limit of the dilution zone corresponds to $\Delta I = \Delta I \text{ ref} + 5\%$.

The left-hand limit of the dilution and boration zones varies as a function of the power. The boundary of the dilution zone to the right of the vertical line $\Delta I - \Delta I \text{ ref} = 0$ is inclined relative to the vertical to allow for the effect of the group R in the upper part of the core.

It is seen in FIG. 2 that the zones of dilution 2 and of boration 3 are themselves divided into zones D1, D2 and B1, B2 and B3, respectively.

In the zone D1, the dilution by introduction of pure water into the primary circuit of the reactor is modulated depending on the deviation of the operating point relative to the high limit of the neutral zone, corresponding to the 229 step horizontal line. The injection of pure water therefore takes place at a rate increasing from the value 0 up to its maximum value, according to whether the operating point is at the lower limit or at the upper limit of the zone D1.

Such a modulation permits the effect of the dilution to be adapted to what is required to maintain the temperature of the reactor above a limit which is not far from the reference temperature, allowing for the effect of the xenon which accompanies the variations of reactivity.

In the whole of the zone D2, the dilution takes place at maximum rate to maintain the temperature of the core and the axial power imbalance at appropriate values.

With regard to the boration, its action of regulating the temperature at the same time as maintaining the axial distribution as close as possible to its reference value should permit a formation of effluents which is smaller or, at most, equivalent to those products in the case of a manual control of the means of boration and of dilution.

The limit of boration has been fixed at a value equal to $\Delta I \text{ ref} - 3\%$, where the axial power imbalance is concerned.

Furthermore, in the zone B1 inside the boration zone 3, the triggering of the boration is delayed as a function of the deviation between the measured axial imbalance $\Delta I$ and the value $\Delta I \text{ ref} - 3\%$ and of the cumulated time of overshoot. For this purpose, use is made of a regulator with proportional and integral action which permits the boration operation to be triggered only if the disturbances in the axial power imbalance extend beyond the usual time of the average disturbances. If the deviation between the measured $\Delta I$ and $\Delta I$ ref$-3\%$ has a value which is greater than a threshold value supplied to the regulator, the boration is immediate.

This device makes it possible to avoid untimely boration operations, while allowing for the effect of the xenon accompanying some disturbances in the axial power imbalance.

To solve the problems related to the inertia of the means of boration and of dilution which do not allow a fine control of the boron concentration in the primary circuit, a technique for injecting boric acid in defined doses in an accurate manner has, furthermore, been developed.

The volume of each dose is a function of the signal of temperature error $\Delta T$. This function is repeatedly brought up to date as a function of the exhaustion of the fuel. The interval between the injection of two doses is chosen in such a way that the preceding dose has completed its effect before a second injection is permitted.

To increase the speed of boration, the interval between two injections of a unit dose of boric acid is decreased.

To obtain a more efficient and faster boration, the interval between the sending of two successive doses of boric acid will therefore be reduced. The boration must be faster in proportion to the increased deviation of the operating point expressing the position of the group R from the lower limit of the neutral zone, i.e., from the upper limit of the boration zone. The interval between two doses will therefore be a decreasing monotonic function of the deviation of the position of the group R relative to the lower limit of the neutral zone.

A fast boration results in a fast withdrawal of the regulating group R and hence a rapid movement of the axial power imbalance $\Delta I$ towards the positive values, with the result that it is necessary to limit this change of the $\Delta I$ increasingly in proportion to the approach to the right-hand boundary $\Delta I$ ref$-3\%$ of the boration zone. The interval between the injection of two successive doses will therefore also be a decreasing monotonic function of the deviation between the measured $\Delta I$ and the limit $\Delta I$ ref$-3\%$.

The greater of the two intervals determined as a function of the distance of the group R relative to the lower limit of the neutral zone and as a function of the interval of the $\Delta I$ relative to $\Delta I$ ref$-3\%$, respectively, is employed to control the means of boration.

In the zone B1, the boration is therefore delayed by a proportional integrating regulator as a function of the deviation $\Delta I - (\Delta I$ ref$-3\%)$. The interval between the doses of boric acid which are injected into the primary fluid is a function of either of the two parameters: -deviation $\Delta I - (\Delta I$ ref$-3\%)$, -deviation of the position of the group R relative to the lower limit of the neutral zone.

In the zone B2, the boration is immediate but the interval between the injections of two successive doses is always a function of either of the two preceding parameters.

In the zone B3, the boration is immediate and the interval between the doses is a function only of the deviation of the position signal of the group R relative to the lower limit of the neutral zone.

In the zones B1 and B3 arrows indicate the direction of an increase in the flow of boration as a function of the value of axial power imbalance and of the position of the group R relative to the lower limit of the neutral zone, respectively.

The dilution can take place by means of a modulated flow of pure water or by means of successive doses of pure water injected at a constant flow rate.

FIGS. 3a to 3e show the change in various parameters over time, in the case of the operation of a nuclear reactor in which a fast decrease in the power has been produced, at 5% per minute, from 100% down to 50% of the nominal power, followed by a stabilization of the power at 50% of the nominal power for one hour and finally a fast recovery of load at 5% per minute with stabilization at 100% of the nominal power.

Figure 3A:
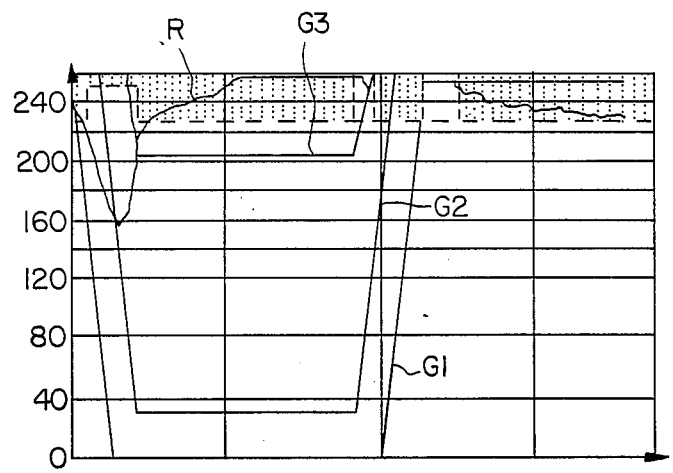
FIGS. 3a, 3b, 3c, 3d and 3e are diagrams showing the change in various parameters with time during an operation of the reactor with a variation in the power demanded.

FIG. 3a shows the movements of the groups of control rods, on a diagram showing the number of withdrawal steps of the absorbing groups as a function of time.

Use is made of three power regulating groups having reduced anti-reactivity, called "gray groups" or "G groups" and a regulating group consisting of highly absorbing rods and called "group R". The diagram of FIG. 3a also shows the working bands of the group R in the upper part of the core.

Figure 3B:
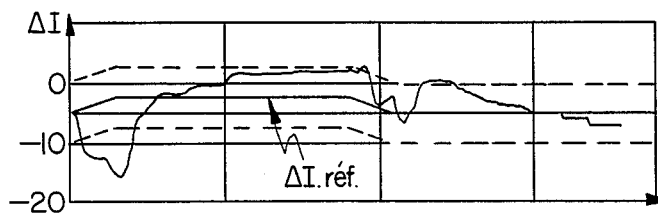

FIG. 3b shows the change in the axial power imbalance relative to the reference axial imbalance and relative to a band whose width is plus or minus 5% around the reference $\Delta I$.

Figure 3C:
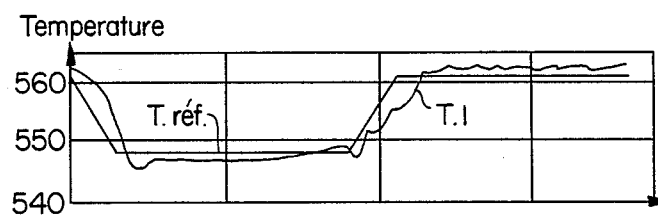

FIG. 3c shows the change in the mean temperature of the core compared with the change of the reference temperature which is a function of the power level of the reactor.

Figure 3D:
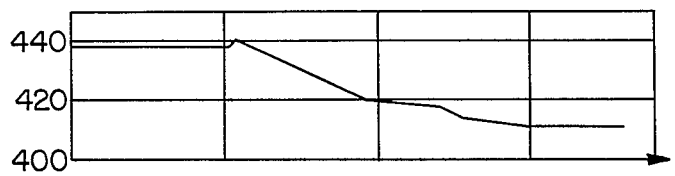
Figure 3E:
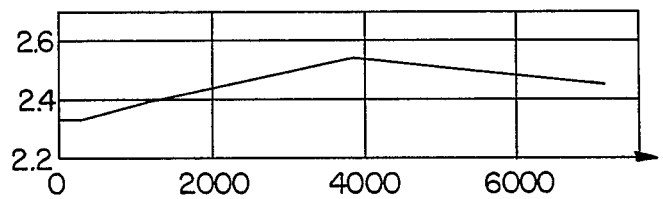

FIG. 3d shows the change in the boron concentration, and FIG. 3e the xenon concentration, as a function of time.

The neutral zone or the working zone of the group R has been determined in the following manner: its width around the reference axial imbalance is 5% on either side and its amplitude for $\Delta I = \Delta I$ ref$-5\%$ is ten steps.

To obtain a decrease in reactor power from 100% of the nominal power to 50% of this nominal power, the gray groups G1, G2 and G3 are inserted in succession into the core of the reactor as far as a position determined by the value of the power demanded.

The relatively low efficiency of the gray groups having reduced anti-reactivity causes an insertion movement of the group R beyond the neutral zone. The axial power imbalance $\Delta I$ decreases strongly to assume a value below $\Delta I$ ref$-5\%$. The width of the working band of the group R is then 10 steps.

The insertion movement of the group R called for by the decrease of the reference temperature moves the operating point far below the lower limit of the neutral zone into the boration zone.

No boration is carried out, however, as can be seen in FIG. 3d, an inhibition of the means of boration having intervened.

In fact, in the case of an operation in a fast transient such as the acquisition of a new power level, load rejection or any rising or descending power gradient greater than 2 or 3% per minute, the regulating group R moves in insertion or in withdrawal, in the same direction as the gray groups, until the time when the reference temperature is stabilized at its new level. The regulating group then returns to its working band by a reverse movement. The operating point whose coordinates correspond to the position of the group R and to the axial power imbalance is caused to move either into the boration zone or into the dilution zone. If an actual boration or an actual dilution were then carried out, this action would, in the majority of cases, move in a direction aggravating the effect of the reactivity resulting from the variation in the concentration of xenon which accompanies the variation in reactivity.

There is therefore a need to inhibit the action of boration or of dilution during the movement of the gray power control groups during a fast transient phase. It is considered that a transient operating phase is fast if the deviation between the target position and the measured position of the gray groups exceeds a certain threshold. In the case where this threshold is exceeded, a signal commands the inhibition of the boration and of the dilution.

In general, when the gray groups have reached the target position, for example the insertion position shown in FIG. 3a, the group R has not yet returned into its working band. The position of the operating point would then call for a boration in the operating case shown in FIGS. 3a to 3e. This action is not desirable, since the group R continues its withdrawal to return into its working band, the gray rods being stationary and the power at its new level.

A second inhibition of the boration system is therefore introduced, which is activated by a signal transmitted when the regulating group R moves towards the neutral zone. This inhibition is also maintained during the thirty seconds following the stopping of the regulating group R even if this group has not yet returned to the neutral zone.

In actual fact, the boration (or dilution) action is inhibited if the group R moves rapidly, which is the case in a phase of operating in a rapid transient. On the other hand, the boration (or dilution) action is permitted if the time interval between two steps of movement of the regulating group R is greater than thirty seconds. It is considered in this case, in fact, that the new equilibrium of the group R has been reached and a boration (or dilution) action is triggered to bring the regulating group into the neutral zone.

It can be seen therefore that these inhibitions, in the case of a fast transient, as shown in FIGS. 3, make it possible to avoid untimely actions of the means of boration or the means of dilution.

In FIG. 3d it is seen that the boron concentration in the primary fluid remains constant during the movements of the gray groups and during the return of the regulating group R towards its working band.

The regulating group R continues to move in the direction of the withdrawal until the time when it reaches the upper limit of the neutral zone.

There is then no further inhibition of the means of dilution and of boration, since the gray groups are stationary and the group R has returned into its working band. The movement of the operating point beyond the upper limit of the neutral zone, i.e., into the dilution zone, calls for an actual triggering of the means of dilution by an injection of pure water.

The deviation of the axial power imbalance relative to the reference axial imbalance is then positive and the operating position is in the zone D2 of the diagram where the dilution takes place at its maximum flow rate. This dilution makes it possible to maintain the mean temperature of the core close to the reference temperature and the axial power imbalance close to its upper permissible limit equal to $\Delta I$ ref$+5\%$.

The withdrawal of the gray groups at the end of the power level causes a rise in the reference temperature and a reduction in the axial power imbalance, which returns to the value of the reference axial imbalance. The operating point then comes into the zone D1 of the diagram, producing a modulation of the dilution flow rate as a function of the deviation of the operating point relative to the high limit of the neutral zone. The injection flow rate is then reduced, since the operating point is near the limit of the neutral zone.

This dilution at a reduced flow rate will continue until the time when the operating point returns into the zone D2. The injection at a maximum flow rate is once again employed before the final stabilization, the group R stabilizing near the central part of the neutral zone.

FIG. 3e shows that the concentration of xenon remained relatively stable over the whole transient.

It can be seen that the main advantages of the process according to the invention are to permit carrying out completely automatically all the dilution and boration operations, taking account of the position and movements of the regulating group R and of the value of the axial power imbalance. The control of temperature is carried out automatically by the movement of the group R, assisted by the means of boration and of dilution. The evolution of xenon is also perfectly controlled, even during the fast transients.

Finally, the automatic control permits an anticipated action of the means of boration or of dilution, independently of any movement of the group regulating the temperature.

The invention is not limited to the embodiments which have been described; on the contrary, it comprises all the alternative forms.

Thus, the process according to the invention applies not only in the case of a control mode using gray groups having reduced anti-reactivity and a highly absorbing regulating group, called mode G, but also in the case where only strongly absorbing groups are employed, for example in the control mode called mode A.

The definition of the limits of the neutral zone, of the dilution zone and of the boration zone depends on the operating conditions of the reactor and on the permitted safety standards. The numerical values given in the examples are therefore not limiting in any way. The boundaries of the regions of boration and of dilution can be easily deduced from the operating trapezoid of the reaction which defines the operating limits of the latter.

The means of dilution and of boration can be controlled so as to act in an anticipated manner, by adding to the position signal of the temperature of the regulating group a signal which is proportional to the deviation between the mean temperature of the core and the reference temperature. In some cases, however, use will still be made of the signal corresponding to the actual position of the group R. This will always be the case, in particular, when a reactor operates under remote control or for frequency control.

The automatic control of the means of boration and the means of dilution can be carried out by any means known to those skilled in the art which make it possible to compare signals to predetermined values defining the operating ranges of the means of boration or of dilution. It will be possible to produce a display of the position of the operating point relative to the neutral zone and to the boration and dilution zones.

Finally, the invention applies in all cases where a pressurized water nuclear reactor employs a temperature regulating group consisting of rods of absorbing material and a modification of the soluble boron content in the pressurized water to control the reactor.

We claim:

1. A process for automatic control of the boration or dilution system of the cooling water of a pressurized water nuclear reactor whose control is ensured by the vertical movement of control rods absorbing the neutrons in the core of the reactor consisting of assemblies arranged vertically and side-by-side and by the boration or dilution of the pressurized water by virtue of means of boration and means of dilution of this water, the control rods comprising at least one regulating group consisting of highly absorbing rods which are moved automatically as a function of the deviation between the means temperature of the core and a reference temperature which is a function of the power to be supplied by the reactor and of means associated with the reactor for determining the axial power imbalance in the core and the deviation of this axial imbalance relative to a reference imbalance corresponding to the minimum insertion of the control rods into the core and to the equilibrium of the xenon concentration, said process comprising the steps of
   (a) determining a priori operating regions of the means of boration and the means of dilution, respectively corresponding to pairs of values of two control parameters, namely, a parameter which is characteristic of the position of the regulating group in the core and the deviation in the axial power imbalance relative to the reference imbalance, said operating regions being determined to retain convenient reactor operation conditions on a continuous basis and to comply with prevailing safety standards;
   (b) determining, in a continuous manner, during the operation of the reactor, the momentary value of the deviation in the axial power imbalance relative to the reference imbalance and the momentary value of the parameter which is characteristic of the position of the regulating group in the core of the reactor, forming a pair of values of the control parameters;
   (c) determining the position of the pairs of values with respect to the operating regions;
   (d) triggering the operation of the means of boration or the means of dilution if the pair of values of the control parameters corresponds to an operating region of the means of boration or the means of dilution, respectively, and maintaining these means at rest if the pair of values does not correspond to an operating region in the case where the means of boration and the means of dilution are initially at rest; and
   (e) maintaining the operation of these means so long as the pair of values of the control parameters corresponds to an operating region of these means of boration or of dilution in the case where the means of boration or of dilution are initially operating.

2. The process for automatic regulation as claimed in claim 1, wherein the parameter which is characteristic of the position of the regulating group in the core corresponds to an imaginary position of the regulating group taking account of the movement of the regulating group required as a function of the deviation between the mean temperature of the core and the reference temperature, the means of boration and of dilution acting thereby in an anticipated fashion.

3. The process for automatic regulation as claimed in either of claims 1 or 2, wherein the dilution zone (2) comprises two parts, namely a zone (D1) in which the means of dilution are controlled so as to have a modulated action as a function of the deviation of the operating point representing the control parameters, relative to the lower limit of the dilution region, if a movement of the regulating group in the direction of withdrawal is considered, and a second zone (D2) where the dilution is carried out with a maximum flow rate, when the operating point is therein.

4. The process for automatic regulation as claimed in any one of claim 1 or 2, wherein the region of boration is divided into three parts, namely a zone (B1) where the boration can be delayed in time as a function of the value of the axial power imbalance and where the boration flow rate depends on the axial power imbalance and on the position of the regulating group relative to the upper limit of the boration zone, a zone (B2) where the boration is immediate and where the rate of boration depends on the axial power imbalance and on the position of the regulating group relative to the upper limit of the boration zone and, finally, a zone (B3) where the boration is immediate and where the boration flow rate depends only on the position of the regulating group relative to the upper limit of the boration zone.

5. The process for automatic regulation as claimed in claim 4, wherein the means of boration consist of a device for injecting, in doses, water containing boric acid, each dose having a volume which is a function of the temperature deviation between the mean temperature of the core and the reference temperature, and the time interval between the injection of two successive doses being modulated to vary the rate of boration.

6. The process for automatic regulation as claimed in claim 1 or 2, in the case where the operation of the reactor is carried out with an assembly of power control groups having reduced antireactivity and by a highly absorbing group for regulating temperature, wherein an inhibition of the means of dilution and of boration is produced in the case where the deviation between the real momentary position of the power regulating groups and the required position of these power regulating groups exceeds a certain threshold.

7. The process for automatic regulation as claimed in claim 6, wherein an inhibition of the means of dilution and of boration is produced when the highly absorbing group for regulating temperature is driven outside its working band, during a change of power greater than 2 to 3% of the power per minute and while this regulating group is returning towards its working band, while the power of the reactor is stabilized at its new value after its change.

* * * * *